– – –

United States Patent [19]

Brock

[11] 4,319,404
[45] Mar. 16, 1982

[54] CHAIN SAW SIGHTING DEVICE

[75] Inventor: Helmut E. Brock, Binghamton, N.Y.

[73] Assignee: David C. Young, Greene, N.Y.

[21] Appl. No.: 132,283

[22] Filed: Mar. 20, 1980

[51] Int. Cl.³ ............................................. G02B 23/00
[52] U.S. Cl. .................................. 33/263; 33/185 R;
356/3
[58] Field of Search .................... 356/9, 3, 21, 8, 7,
356/17, 20; 33/185 V, 185 R, 275 R, 286, 276,
289, 263, 284, 262, 227, 228

[56] References Cited

U.S. PATENT DOCUMENTS

| | | | |
|---|---|---|---|
| 1,568,759 | 1/1926 | Magin et al. | 356/8 |
| 1,843,419 | 2/1932 | Francis | 356/7 |
| 3,531,870 | 10/1970 | Romancky | 33/185 R |
| 4,158,259 | 6/1979 | Hansen et al. | 33/262 |

FOREIGN PATENT DOCUMENTS 126260  9/1949  Sweden ................................. 33/284

Primary Examiner—William D. Martin, Jr.
Attorney, Agent, or Firm—Richard G. Stephens

[57] ABSTRACT

A sighting device attachment for a chain saw allows an operator to measure desired lengths to be cut which are substantially greater than the size of the attachment, and allows adjustment to provide a wide variety of lengths.

10 Claims, 8 Drawing Figures

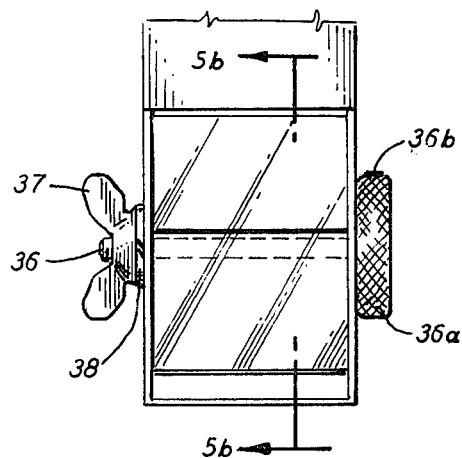
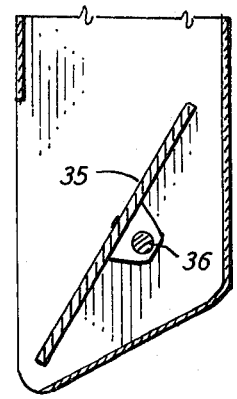
FIG.5a  FIG.5b
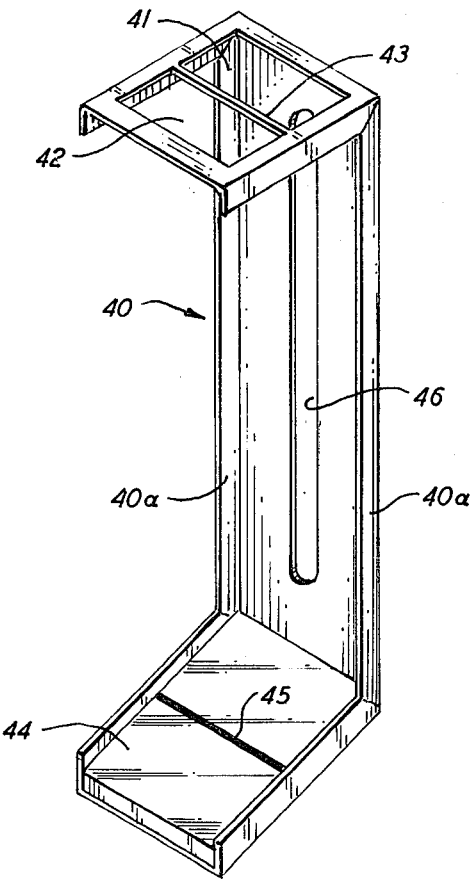
FIG.6

CHAIN SAW SIGHTING DEVICE

This invention relates to measuring or sighting apparatus, and more particularly to simple and economical means which will allow an operator of a portable chain saw to cut wood into standard lengths. It will become apparent as the description proceeds that the invention may be deemed useful as well with various other portable saws.

Chain saws are widely used to cut logs into standard lengths (e.g. 12 or 18 inches, or 30 or 46 cm.) to provide firewood for fireplaces and woodburning stoves. At other times it is necessary to cut substantially longer pieces, such as lengths of 48 inches (1.219 m.). While it is seldom if ever important that such lengths be measured with great precision, it is desirable that the length of each piece not depart from an intended standard length by more than a reasonable tolerance. A piece which is too long to fit within a stove may tend to become useless. In addition, persons who purchase firewood in cords or stacks sometimes become suspicious of being cheated if a stack has pieces of numerous different lengths.

While the operator of a chain saw can use a ruler, a measuring tape, or even a stick of measured length to mark off successive lengths to be cut from a log, it becomes advantageous if he need not periodically reach into a pocket to retrieve or to store such a device, nor have to carry such a device without losing it. It previously has been proposed that various types of measuring rods or wires be attached to a chain saw for use as length-measuring means. Devices of that nature of which I am aware are disadvantageous either because they are easily bent or otherwise damaged, or they tend to interfere with some chain saw operations. Various elongated rods or like length-indicating devices which one conceivably might mount on a chain saw to protrude therefrom can snag on or strike branches or trees and create danger. One object of the present invention is to provide a length-measuring guide for a chain saw which does not require use of any protruding elongated rods or the like, thereby adding to safety.

Another object of the invention is to provide a length-measuring device for a chain saw which does not interfere with usual chain saw cutting operations.

A further object of the invention is to provide a length-measuring device for a chain saw which does not appreciably interfere with storage or portability of the chain saw. A further object of the invention is to provide length-measuring apparatus for a chain saw which can be readily adjusted to measure a variety of different lengths.

Another object of the present invention is to provide a length-measuring device for a chain saw which allows one to readily measure lengths which are substantially greater than the length or size of the measuring device.

Other objects of the invention will in part be obvious and will in part appear hereinafter.

The invention accordingly comprises the features of construction, combination of parts, which will be exemplified in the constructions hereinafter set forth, and the scope of the invention will be indicated in the claims.

For a fuller understanding of the nature and objects of the invention reference should be had to the following detailed description taken in connnection with the accompanying drawings, in which:

FIG. 1a is a geometric diagram useful for an understanding of use of the invention in an alternate mode for measuring greater lengths.

FIG. 5a is an elevation view illustrating one modification of the invention, and FIG. 5b is a cross-section view taken at lines 5b—5b in FIG. 5a.

FIG. 6 is an isometric view of yet another embodiment of the invention.

Figure 2:
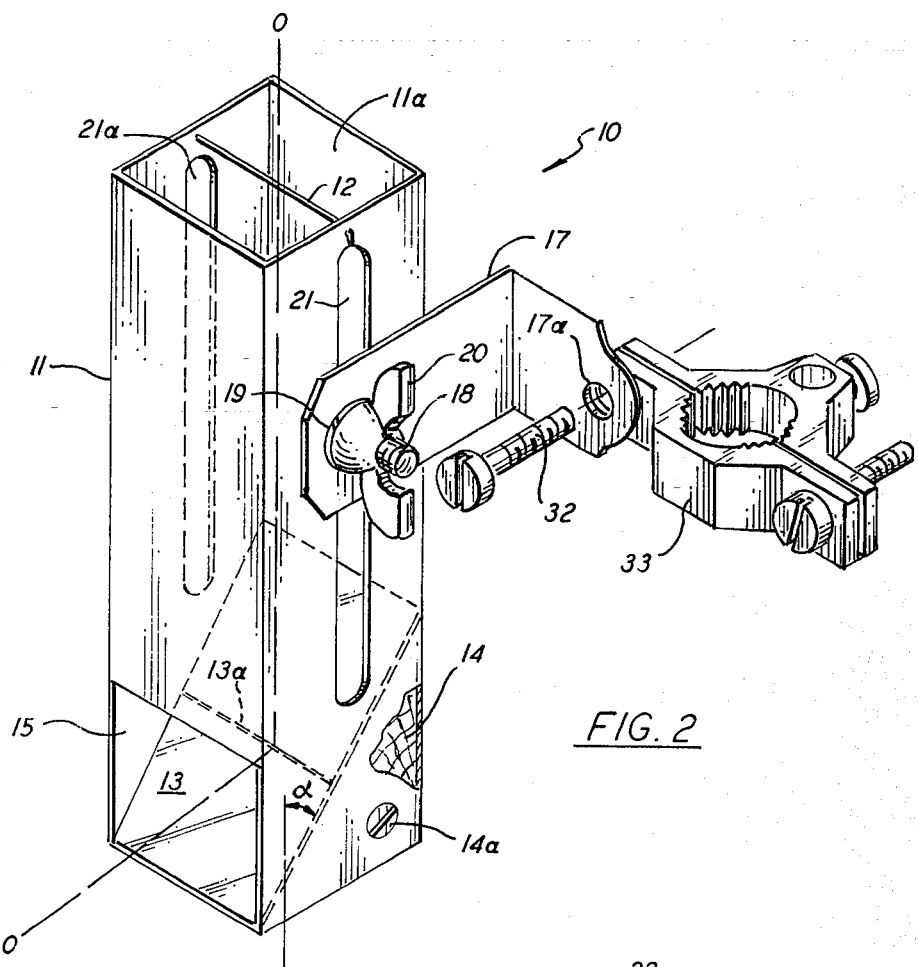
FIG. 2 is an isometric view of a preferred form of sighting device according to the invention.

Referring to FIG. 2 the saw sight 10 is thereshown comprising a length of hollow tubing 11 having an open upper end 11a. A length of wire 12 extends across tubing 11 near end 11a to provide a first reference line. Wire 12 is shown passing through small holes in opposite walls of tube 11 with the ends of the wire bent to maintain it in place. A planar mirror 13 is shown carried on support block 14 at the lower end of the tubing, with the mirror surface arranged at an acute angle $\alpha$ relative to the lengthwise axis of the tubing. Mirror 13 comprises a thin glass rear-silvered mirror which is assumed to be cemented on a wooden block support member 14 of triangular cross-section fitted inside tube 11 and held therein by one or more screws, such as screw 14a. A stripe 13a painted or otherwise provided on the mirror surface forms a second reference line extending parallel to wire 12. The two reference lines define a plane which is shown corresponding to the lengthwise axis of tube 11, though that precise relationship is not necessary. A portion of one wall of the tubing is cut away adjacent mirror 13 to provide a window 15. It will be seen that light entering window 15 along a particular axis O may strike lower reference line 13a on mirror 13, and be reflected upwardly therefrom along the sighting axis to intercept the upper reference line defined by wire 12.

Tube 11 is shown mounted on an arm 17 by means of a carriage bolt 18, spring washer 19 and wing nut 20, the carriage bolt passing through an elongated slot 21 provided in one side wall of the tubing. It will be apparent that by temporarily loosening wing nut 20 one may move tube 11 vertically relative to arm 17, as well as pivoting tube 11 relative to arm 17 about the axis of the carriage bolt. A similar slot 21a is also preferably provided in the opposite side wall of tubing, allowing the sight to be used for either "lefthand" or "righthand" operation, as will become clear below. A single slot may be used in some embodiments of the invention on the rear wall of the tube, as shown in an alternative embodiment below.

A bolt 32 passes through hole 14a in arm 17 and is threaded through one side of a clamp 33, which is shown as comprising a conventional electrical grounding clamp of the type widely used to connect electrical ground wires to water pipes or the like. Such a clamp will allow the sighting device 10 to be readily mounted on the handle of a wide variety of different types and models of chain saws, though other mounting techniques may be used, of course, particularly in cases where the sighting device is provided as original equipment on a saw.

Figure 1:
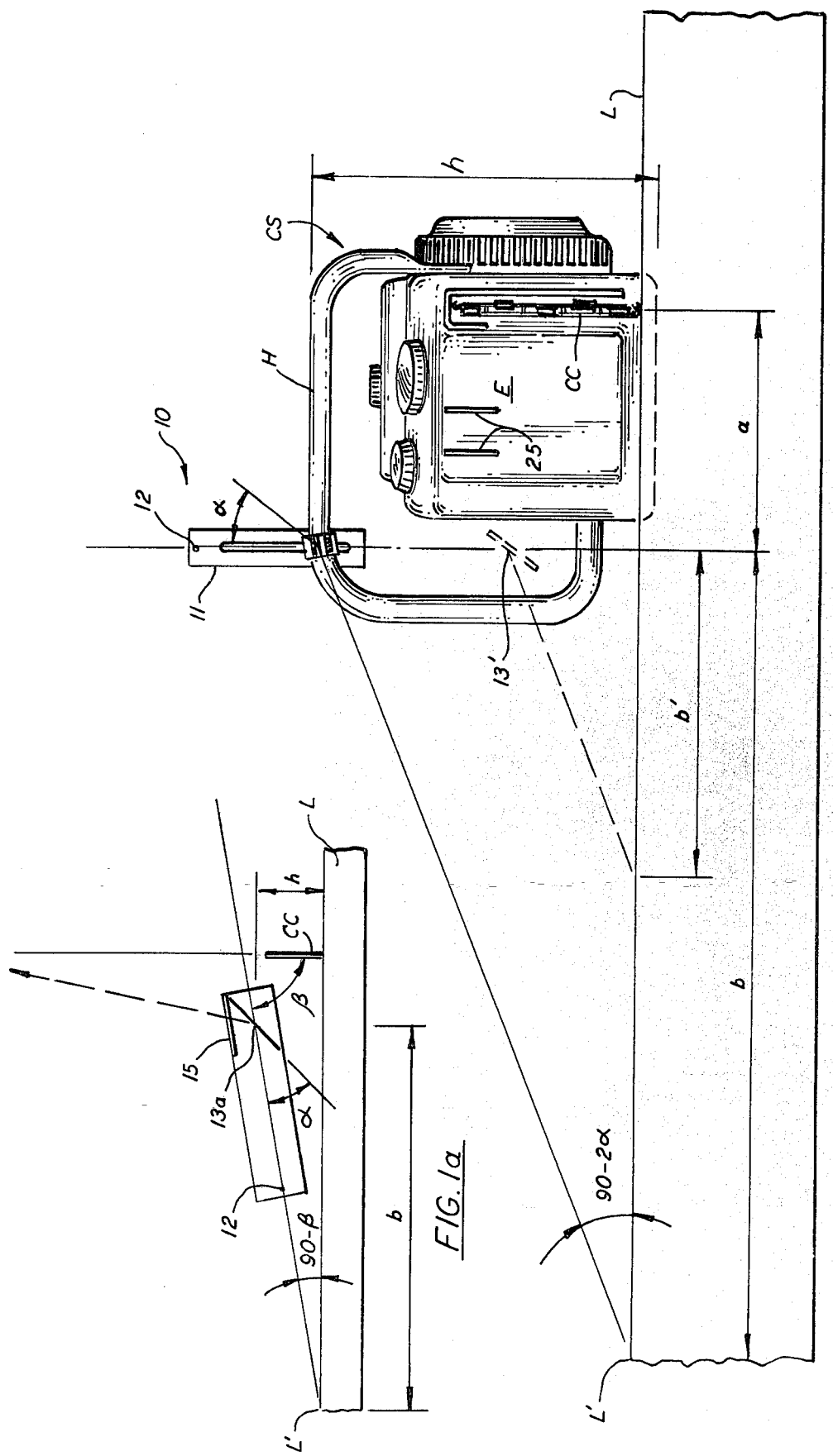
FIG. 1 is a diagrammatic elevation view useful in understanding operation of the invention with a typical chain saw for measuring short lengths.

Referring now to FIG. 1, the sighting device 10 is shown clamped on the upper portion of handle H of a conventional chain saw CS having an engine E and a cutting chain (not shown) carried on a chain carrier CC. The sighting device is clamped on the handle so that the plane defined by wire 12 and stripe 13a extends parallel to the plane of chain carrier CC, both of those directions being shown as vertical in FIG. 1. It is by no means necessary that the device be mounted on the upper portion of the handle; it could as well be clamped to either side of the handle, or fastened to the engine housing. The chain saw is shown resting atop a log L. If the operator peers down into the sighting device in a direction so as to see the upper reference line defined by wire 12 superimposed on stripe 13a on mirror 13, he will be sighting accurately along the axis of tube 11, and if he simultaneously can see edge or end L' of log L in the mirror adjacent the wire and stripe, the dimension b shown in FIG. 1 then is given by the formula: $b = h/\tan(90 - 2\alpha)$ where h is the vertical distance between the lower chain course or lower edge of chain carrier CC and the elevation of stripe 13a on the mirror. The length of log he would cut off if he began sawing with such sighting conditions would be dimension (b+a), of course. In order to calibrate the sighting device for pieces of a desired length, the operator merely need measure the length once, place the saw chain at one end of the measured length, loosen wing nut 20 and adjust tube 11 vertically until the other end of the measured length appears in the mirror adjacent wire 12 and stripe 13a, and then tighten the wing nut. Thereafter, any time he views a log end in the mirror adjacent the superimposed wire and stripe, he can be sure that the saw chain is located the same distance (b+a) from the end of the log.

In FIG. 1 mirror 13 is shown in dashed lines at 13' in a lowered position, and it now will be apparent that if tube 11 were lowered to put mirror 13 at that position, that the distance between the saw chain and whatever is viewed in the mirror at the superimposed wire and stripe then would be dimension (b'+a).

The acute angle $\alpha$ between the plane of mirror 13 and the plane defined by wire 12 and stripe 13a may vary in different applications. It will always be less than 45 degrees, and ordinarily more than 22.5 degrees, and in one satisfactory embodiment an angle of about 34 degrees was used. The ideal value for a given application depends upon the range of cut lengths to be accommodated and the elevation above the bottom of the saw chain deemed allowable for the top of the sighting device, which in turn depends upon the length of the sighting device. In the mentioned embodiment wherein an angle of 34 degrees was used, the distance between wire 12 and stripe 13a was 4.5 inches. Distance b varied from 18 to 12 inches as distance h varied from 7.27 to 4.85 inches, and thus the top of the sighting device varied between about 11.77 inches and 9.35 inches above the bottom curve of the chain.

In order to maintain reasonable accuracy, it is important that the sighting axis remain parallel to the plane of the chain carrier as the sighting device is adjusted to different vertical positions. In embodiments wherein the device is clamped to the handle as shown, one or several lines or stripes running parallel to the chain carrier may be inscribed on the saw, as at 25, for example, to facilitate proper adjustment of the sighting device.

In accordance with a further feature of the invention, the sighting device is made readily convertible for operation in a second mode, for use while cutting substantially longer lengths. As shown diagrammatically in FIG. 1a, in the second mode the sighting device is fixed on the chain saw with the plane defined by wire 12 and stripe 13a at a distinct angle $\beta$ relative to the plane of the chain carrier, and with window 15 directly visible to the operator. The angle $\beta$ is shown with a value approaching 90 degrees. In the second mode the operator similarly aligns wire 12 and stripe 13a, but rather than seeing wire 12 superimposed on stripe 13a, he now views in a direction such that wire 12 appears behind stripe 13a. If the angle $\alpha$ is 34 degrees, for example, if stripe 13a is 8.34 inches above the bottom edge of the chain carrier CC, and if angle $\beta$ is 80 degrees, for example, the distance b shown in FIG. 1a would be 48 inches (121.9 cm.). Thus by pivoting the sighting device to orient the plane defined by wire 12 and stripe 13a to a nearly horizontal position, the device may be used to properly sight substantially longer lengths. As angle $\beta$ is increased toward 90 degrees, very long lengths can be measured. It will be apparent that tube 11 can be readily swung to an orientation of the nature shown in FIG. 1a by merely temporarily loosening wing nut 20.

It is important to note that while performing typical chain saw operations, an operator usually holds the chain saw with one of his hands on handle H, which tends to place the sighting device in front of him, with its upper end comfortably below his face level, so that he can sight down into the device very conveniently.

FIG. 1 illustrates use of the sighting device to sight leftwardly (as viewed in FIG. 1), with arm 17 (FIG. 2) assumed to be bolted to slot 21. It will be apparent that the device can be rotated 180 degrees about a vertical axis with arm 17 bolted instead through slot 21a. The line of sight then would slope rightwardly and downwardly, over the top of chain carrier CC. Which of the two alternate configurations an operator will prefer ordinarily will depend upon whether he (or she) is right-handed or left-handed.

Figure 3:
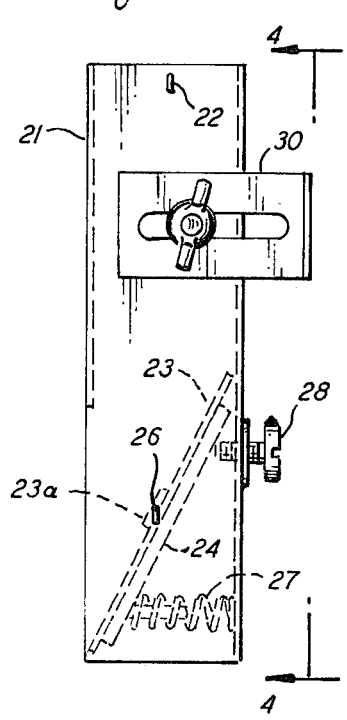
FIG. 3 is an elevation view of an alternative form of the invention.
Figure 4:
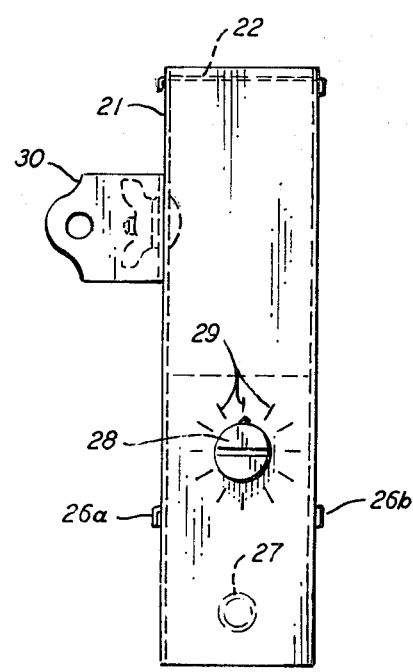
FIG. 4 is an elevation view taken at lines 4—4 in FIG. 3.

In a modified form of the invention illustrated in FIGS. 3 and 4 plane mirror 23 is carried on a support 24 which is pivotally mounted on shaft means 26 comprising a length of wire, the ends of which protrude through holes in opposite walls of hollow tube 21, as shown at 26a, 26b. A coil spring 27 urges mirror support 24 clockwise as viewed in FIG. 3, with the mirror support butting against the end of adjustment screw 28, which is threaded through a wall of tube 21. As screw 28 is rotated to advance its end into tube 21, mirror 23 is manifestly rotated counterclockwise. A stripe 23a is provided on mirror 23 to define a reference line which may be visibly aligned with a reference line defined by wire 22. A pointer shown provided on the head of adjustment screw 28 may be registered with scale indicia 29 provided on the outside wall of tube 21 to select various cutting lengths. The mirror pivot axis defined by shaft means 26 preferably closely coincides with the location of stripe 23a. As the operator sights down along the plane defined by wire 22 and stripe 23a, the horizontal distance of the object he views through window 25 adjacent the wire and stripe will depend on the angle $\alpha$ to which mirror 23 has been adjusted in accordance with the relationship previously given. The plane defined by wire 22 and stripe 23a is aligned to be parallel with the cutting plane of the saw while short lengths are to be measured, and the pivotal adjustment of mirror 23 makes it unnecessary for the device to be raised or lowered to select various short cutting lengths, so that slots need not be provided along tube 21 to provide for vertical adjustment. The tube 21 is shown mounted on an arm 30 by means of a bolt and a wing nut which passes through a hole in one side wall or the other, allowing the device to be alternately rotated to provide operation of the type previously explained in connection with FIG. 1a, with the plane defined by wire 22 and stripe 23a nearly perpendicular to the cutting plane of the saw.

FIGS. 5a and 5b illustrate an alternative technique for providing tilting adjustment of the mirror to vary the angle α. The mirror 35 is assumed to be a metal mirror brazed or otherwise affixed to a bolt 36, which passes through a pair of holes in opposite walls of tube 11 to be rotatably journalled therein. Bolt 36 is shown provided with a knurled head 36a. A wing nut 37 and spring washer 38 are carried on the other end of the bolt, and by tightening the wing nut on the bolt the mirror may be clamped at any desired angle α. The bolt head may carry a pointer indicium 36b to cooperate with scale indicia (not shown) on the wall of the tube, if desired.

The alternative embodiment illustrated in FIG. 6 is shown as comprising a one-piece metal stamping 40. A pair of apertures 41,42 provided in an upper end portion leave a central crossbar 43 which defines a reference line. A glass mirror 44 assumed to be cemented on the lower end carries a stripe 45 defining a second reference line, and the surface of mirror lies at the acute angle α previously described relative to the plane defined by the pair of reference lines. The stamping is shown provided with flanges 40a to provide rigidity. Elongated slot 46 allows for adjustment in the same manner as that of the device of FIG. 2. While a glass mirror is shown in FIG. 6, it should be recognized that a mirror surface instead may be provided by plating a portion of the stamping. It will be further noted that the device could instead be made by plastic injection molding.

While the invention has been illustrated in connection with a chain saw, it now will be apparent that operation of the device does not depend upon the details of the sawing method, and hence that the invention is readily applicable to various other forms of portable saws, such as the Homelite XL-98 multi-purpose saw commonly used by building construction contractors to cut masonry, metal or wood using a rotating circular saw blade which operates in a cutting plane analogous to the cutting plane established by the chain carrier of a chain saw.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A sighting device for a portable saw having a cutting means operable to cut in a cutting plane, comprising, in combination: support means carrying a plane mirror and first line-defining means spaced from said mirror to define a first reference line extending parallel to said mirror, said mirror carrying an indicium defining a second reference line extending parallel to said first reference line; said first and second reference lines defining a first plane; and means for mounting said support means on a saw with said first plane parallel to said cutting plane and providing adjustment of said support means in the direction of said first plane relative to an edge of said cutting means.

2. The device of claim 1 wherein said portable saw comprises a chain saw having a generally planar chain carrier defining said cutting plane, an engine connected to drive a chain on said chain carrier, and a handle on said engine, said mounting means being adapted to clamp to said handle.

3. The device of claim 1 wherein said portable saw comprises a circular saw and said cutting means comprises a rotatable circular saw blade defining said cutting plane.

4. The device of claim 1 wherein the surface of said mirror is arranged at an acute angle to said first plane, said acute angle being greater than 22.5 degrees and less than 45 degrees.

5. The device of claim 1 wherein said support means includes an elongated slot, and said mounting means includes means for gripping said support means at selected positions along said elongated slot to allow said adjustment of said support means.

6. The device of claim 1 wherein said mounting means is alternately adjustable to hold said support means on said saw so that said first plane extends substantially perpendicularly to said cutting plane.

7. The device of claim 1 wherein said support means comprises a hollow tube having a lengthwise axis, said mirror is mounted within said tube adjacent one end of said tube at an acute angle relative to said axis, an opening is provided through a side wall of said tube adjacent said mirror, and said first line-defining means comprises a wire extending across said tube adjacent the other end of said tube.

8. The device of claim 1 having means for pivoting said mirror about an axis parallel to said first and second reference lines.

9. A sighting device for a portable saw having a cutting means operable to cut in a cutting plane, comprising, in combination: support means carrying a plane mirror and means defining a pair of reference lines extending parallel to each other, said pair of reference lines defining a reference plane arranged at an acute angle to the surface of said plane mirror; and means for mounting said support means on a saw with said reference plane arranged at a selected angle relative to said cutting plane.

10. The device of claim 9 having means for varying said acute angle.

* * * * *